United States Patent [19]
Wakasa et al.

[11] Patent Number: 4,834,042
[45] Date of Patent: May 30, 1989

[54] CERAMIC PRECOMBUSTION CHAMBER FOR INTERNAL COMBUSTION ENGINE

[75] Inventors: Akinori Wakasa, Aki; Kazuyuki Mizoguchi; Minoru Machida, both of Nagoya, all of Japan

[73] Assignee: NGK Insulators, Ltd., Japan

[21] Appl. No.: 200,457

[22] Filed: May 31, 1988

[30] Foreign Application Priority Data

Jun. 6, 1987 [JP] Japan .............................. 62-87670[U]

[51] Int. Cl.$^4$ .............................................. F02B 19/16
[52] U.S. Cl. ...................................... 123/271; 123/270
[58] Field of Search ................ 123/254, 270, 271, 273

[56] References Cited

U.S. PATENT DOCUMENTS 4,651,692  3/1987  Morita et al. ................... 123/271 X
4,672,933  6/1987  Taniguchi et al. .............. 123/271 X

FOREIGN PATENT DOCUMENTS 10418  1/1987  Japan .

Primary Examiner—Tony M. Argenbright
Attorney, Agent, or Firm—Arnold, White & Durkee

[57] ABSTRACT

A ceramic precombustion chamber for an internal combustion engine such as a diesel engine consists of a metal ring and a ceramic body fitted in the metal ring by shrinkage fit. The ceramic body has a through-aperture for an injection nozzle and a combustion gas injection aperture. A shrinking allowance at a lower portion of the ceramic body with the metal ring is smaller than that an upper portion of the ceramic body with the metal ring, thereby decreasing surface pressures at the lower portion of the ceramic body to prevent cracks which would occur in the lower portion caused by surface pressures resulting from the shrinkage fit.

7 Claims, 4 Drawing Sheets

FIG_1
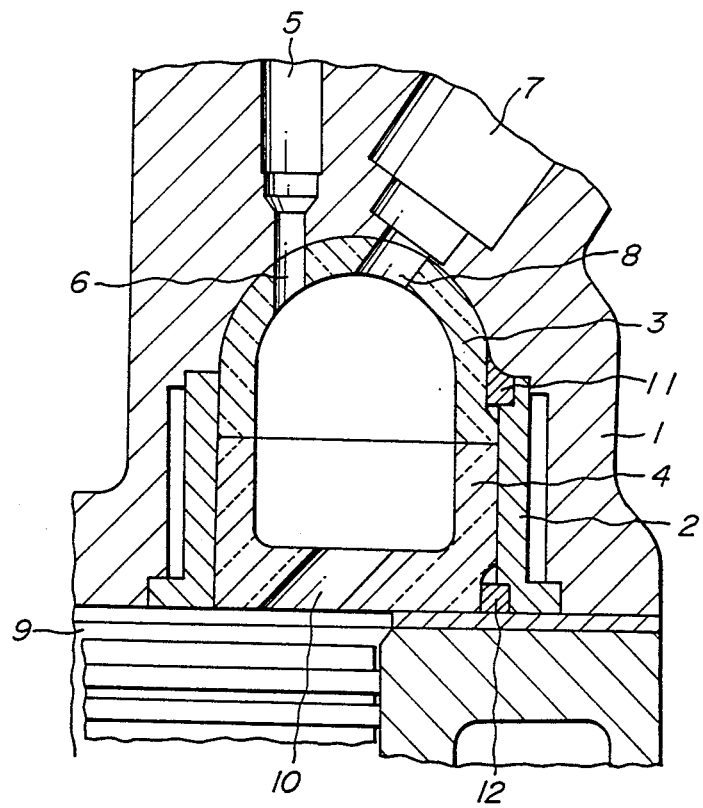

FIG_2
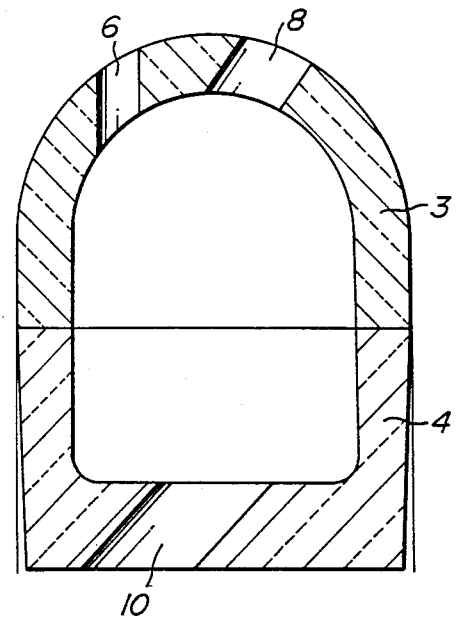
FIG_3
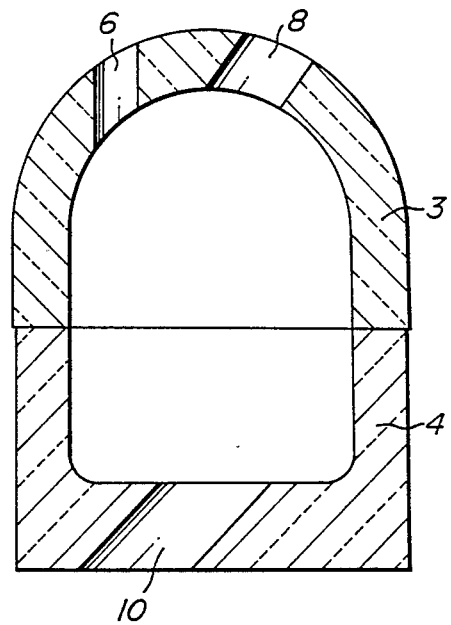
FIG_4
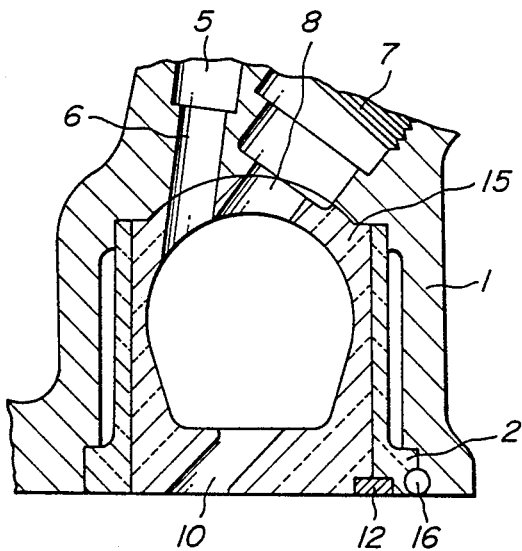

FIG_5
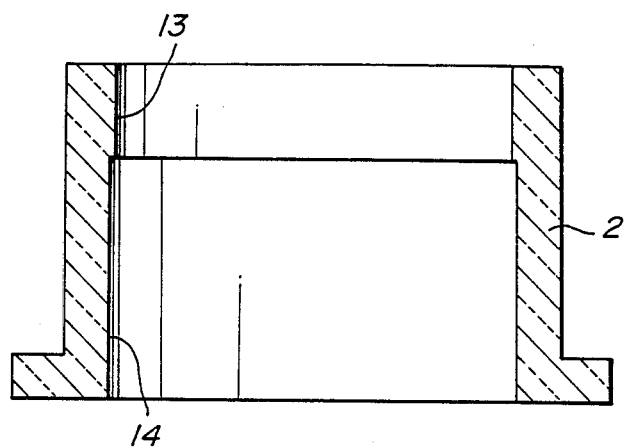
FIG_6
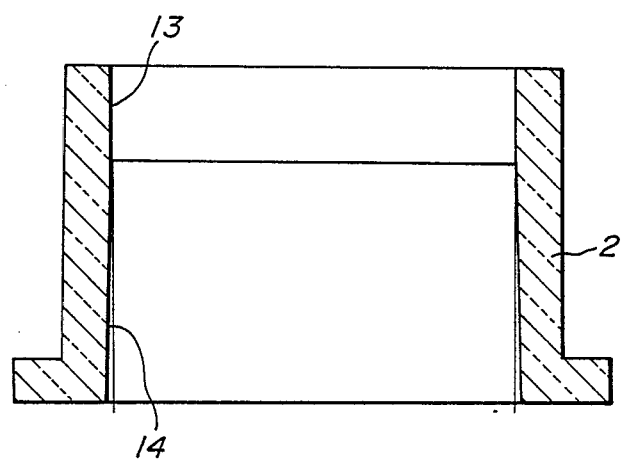

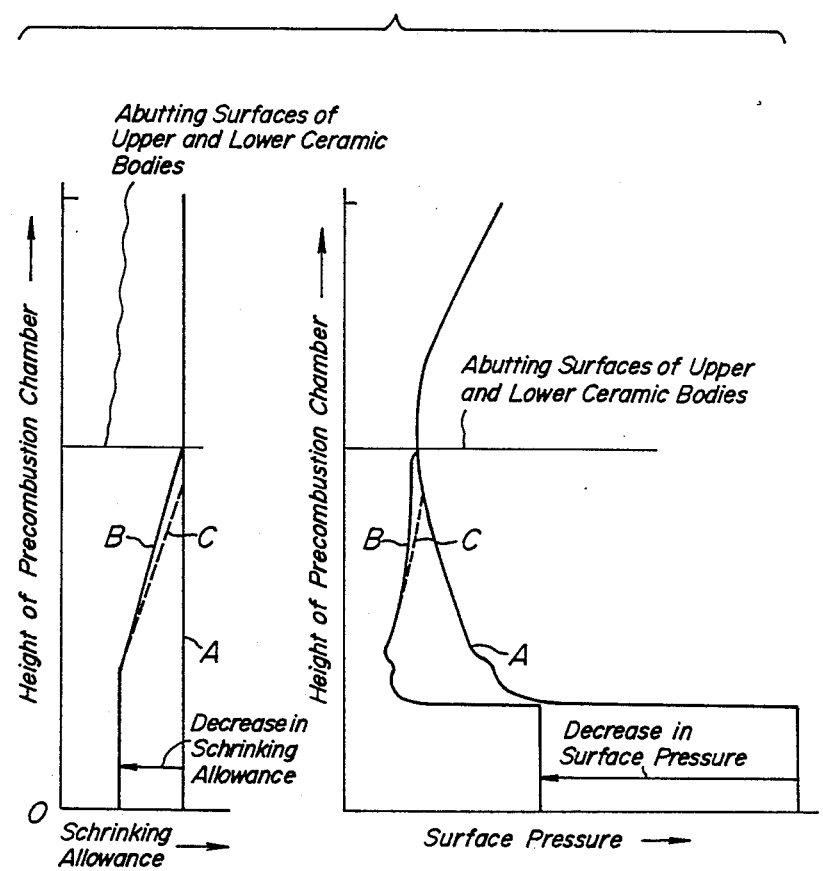

CERAMIC PRECOMBUSTION CHAMBER FOR INTERNAL COMBUSTION ENGINE

BACKGROUND OF THE INVENTION

This invention relates to an improvement of a ceramic precombustion chamber for an internal combustion engine such as a diesel engine.

In order to improve heat-resistance and thermal efficiency of internal combustion engines, it has been widely used to make precombustion chambers by a ceramic body as disclosed in Japanese Patent Application Laid-open No. 62-10,418. Such a ceramic precombustion chamber is usually made of upper and lower ceramic bodies fitted in a metal ring by thermal shrinkage fit for the convenience in manufacture. However, as thicknesses of walls forming a vortex chamber at a lower portion of the ceramic bodies are not uniform, surface pressures on the ceramic bodies caused by the thermal shrinkage fit are uneven. As a result, there is a tendency of cracks to occur in curved portions between a bottom wall and side walls of the lower portion of the ceramic bodies.

SUMMARY OF THE INVENTION

It is a primary object of the invention to provide an improved ceramic precombustion chamber for an internal combustion engine, which prevents cracks which would otherwise occur in a lower portion of ceramic bodies due to uneven surface pressures caused by thermal shrinkage fit.

In order to achieve this object, in a ceramic precombustion chamber for an internal combustion engine, said precombustion chamber including a metal ring and a ceramic body fitted in the metal ring by shrinkage fit and having a through-aperture for an injection nozzle and a combustion gas injection aperture, according to the invention a shrinking allowance at a lower portion of the ceramic body with said metal ring is smaller than that at an upper portion of the ceramic body with said metal ring.

With this arrangement, surface pressures at the bottom of the ceramic body are decreased to prevent cracks which would otherwise occur in the ceramic body.

The invention will be more fully understood by referring to the following detailed specification and claims taken in connection with the appended drawings.

BRIEF DESCRIPTION OF THE DRAWINGS

FIG. 1 is a sectional view illustrating one example of a precombustion chamber before the present invention is applied thereto;

FIG. 2 is a sectional view illustrating a first embodiment of the invention;

FIG. 3 is a sectional view illustrating a second embodiment of the invention;

FIG. 4 is a sectional view illustrating a unitary ceramic precombustion chamber before the present invention is applied;

FIG. 5 is a sectional view illustrating a third embodiment of the invention;

FIG. 6 is a sectional view illustrating a fourth embodiment of the invention; and FIG. 7 is a graph showing distributions of shrinking allowances and surface pressures.

DESCRIPTION OF THE PREFERRED EMBODIMENTS

Referring to FIG. 1, a cylinder head 1 for an internal combustion engine includes a metal ring 2 press-fitted in the cylinder head 1 and upper and lower ceramic bodies 3 and 4 fitted in the metal ring 2 by thermal shrinkage fit. The upper and lower ceramic bodies 3 and 4 are hollow bodies having circular cross-sections to form a precombustion chamber. The upper ceramic body 3 is formed with a through-aperture 6 communicating with a glow plug receiving portion 5 of the cylinder head 1 and a through-aperture 8 communicating with an injection nozzle receiving portion 7 of the cylinder head 1. Moreover, the lower ceramic body 4 is formed with a combustion gas injection aperture 10 for jetting combustion gas into a cylinder chamber 9. Between the metal ring 2 and the ceramic bodies 3 and 4 are inserted keys 11 and 12 for preventing the ceramic bodies 3 and 4 from rotating relative to the cylinder head 1.

In a first embodiment of the invention shown in FIG. 2, an outer contour of a lower ceramic body 4 is progressively reduced in dimension or tapered downwardly so that outer diameters of the lower ceramic body 4 are gradually smaller as they are near its lower end in comparison with an outer diameter of the upper ceramic body 3. As a result, when the ceramic bodies 3 and 4 are fitted in a metal ring 2 having equal inner diameter over its length by thermal shrinkage fit, gradually reducing shrinking allowance on the lower ceramic body along its axial direction is obtained.

The shrinking allowances on the ceramic bodies are set so as to create predetermined surface pressures which are sufficient to prevent the ceramic bodies from being dislodged from a cylinder head. FIG. 7 illustrates the change in surface pressure created by the shrinkage fit in this manner. When an equal shrinking allowance is used over the upper and lower ceramic bodies, larger surface pressures are created at a curved portion between bottom and side walls of the lower ceramic body 4 corresponding to a flange of the metal ring as shown in a solid line A in FIG. 7. In contrast herewith, in case that the shrinking allowance on the lower ceramic body is decreased according to the invention, the surface pressure at the bottom of the lower ceramic body is decreased about 50% as shown in a solid line B in FIG. 7. Substantially the same effect is obtained when the lower ceramic body 4 is tapered starting from a somewhat lower portion than an uppermost end of the lower ceramic body 4 as shown in broken liens C in FIG. 7, although the lines C deviate from the lines B.

In a second embodiment of the invention shown in FIG. 3, a lower ceramic body 4 is straight cylindrical but not tapered and its outer diameter is slightly smaller than that of an upper ceramic body 3. When the upper and lower ceramic bodies 3 and 4 are fitted in a metal ring having a uniform inner diameter by thermal shrinkage fit, a shrinking allowance of the lower ceramic body 4 is smaller than that of the upper ceramic body 3.

In a third embodiment of the invention shown in FIG. 5, an inner diameter of a portion 14 of a metal ring 2 to be in contact with a lower ceramic body 4 is larger than that of a portion 13 to be in contact with an upper ceramic body 3. When upper and lower ceramic bodies 3 and 4 having equal outer diameters are fitted in the metal ring 2 by thermal shrinkage fit, a shrinking allowance on the lower ceramic body 4 is smaller than that on the upper ceramic body 3. In this embodiment shown in FIG. 5, the metal ring 2 is formed in its inner surface with a shoulder resulting from the difference in inner diameter between upper and lower portions of the metal ring 2.

FIG. 6 illustrates a fourth embodiment of the invention, wherein an inside of a metal ring 2 comprises an upper portion having an equal inner diameter and a lower portion to be in contact with a lower ceramic body 4 and having inner diameters gradually increasing as approaching its lower end.

The ceramic precombustion chambers shown in FIGS. 1–3 have been explained divided into the upper and lower ceramic bodies. However, the same effect can be obtained in a unitary precombustion chamber as shown in FIG. 4. In any cases, the surface pressures produced at the bottoms of the lower ceramic bodies can be decreased as shown in FIG. 7, by the feature of the shrinking allowance on the lower ceramic body smaller than that on the upper ceramic body.

As can be seen from the above explanation, according to the invention the shrinking allowance at the lower portion of the ceramic bodies is smaller than that at the upper portion of the ceramic bodies, so that surface pressures at the curved portion between the bottom and side walls of the lower ceramic body are decreased, thereby preventing cracks which would otherwise occur in the curved portion of the lower ceramic body. Therefore, the invention is useful for improving durability and thermal efficiency of a diesel engine and very valuable in practical use.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A ceramic precombustion chamber for an internal combustion engine, said precombustion chamber including a metal ring and a ceramic body fitted in the metal ring by shrinkage fit and having a throughaperture for an injection nozzle and a combustion gas injection aperture, wherein a shrinking allowance at a lower portion of the ceramic body with said metal ring is smaller than that at an upper portion of the ceramic body with said metal ring.

2. A ceramic precombustion chamber as set forth in claim 1, wherein out diameters of said lower portion of the ceramic body are less than those of said upper portion of the ceramic body.

3. A ceramic precombustion chamber as set forth in claim 2, wherein an outer contour of said lower ceramic body is tapered downwardly.

4. A ceramic precombustion chamber as set forth in claim 2, wherein said lower portion of the ceramic body is straight cylindrical, whose outer diameters are smaller than those of the upper portion of the ceramic body.

5. A ceramic precombustion chamber as set forth in claim 1, wherein inner diameters of said metal ring to be in contact with said lower portion of the ceramic body are larger than those of said metal ring to be in contact with said upper portion of the ceramic body.

6. A ceramic precombustion chamber as set forth in claim 5, wherein said metal ring is formed in its inner surface with a shoulder resulting from the difference in diameter in its inside.

7. A ceramic precombustion chamber as set forth in claim 5, wherein said inner diameters of said metal ring to be in contact with said upper portion of the ceramic body are uniform and said inner diameters of said metal ring to be in contact with said lower portion of the ceramic body are gradually increased as they are nearer a lower end of said metal ring.

* * * * *